United States Patent
Hirtenlehner et al.

(10) Patent No.: US 10,844,645 B2
(45) Date of Patent: Nov. 24, 2020

(54) EXTRUSION PROFILE AND METHOD FOR PRODUCING THE SAME, AND DOOR FOR A VEHICLE

(71) Applicant: KNORR-BREMSE GESELLSCHAFT MIT BESCHRÄNKTER HAFTUNG, Mödling (AT)

(72) Inventors: Thomas Hirtenlehner, Aschbach (AT); Markus Illetschko, Neustadtl (AT); Peter Jetzinger, Enns (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 194 days.

(21) Appl. No.: 16/087,316

(22) PCT Filed: Mar. 16, 2017

(86) PCT No.: PCT/EP2017/056275
§ 371 (c)(1),
(2) Date: Sep. 21, 2018

(87) PCT Pub. No.: WO2017/162519
PCT Pub. Date: Sep. 28, 2017

(65) Prior Publication Data
US 2019/0100955 A1 Apr. 4, 2019

(30) Foreign Application Priority Data
Mar. 21, 2016 (DE) .......... 10 2016 105 164

(51) Int. Cl.
*E05F 15/02* (2006.01)
*E05F 15/43* (2015.01)
(Continued)

(52) U.S. Cl.
CPC ............... *E05F 15/43* (2015.01); *B60J 10/86* (2016.02); *E05F 15/42* (2015.01); *E05F 15/44* (2015.01);
(Continued)

(58) Field of Classification Search
CPC . B60J 10/86; E05F 15/42; E05F 15/44; E05F 15/46; E05F 15/43; E05Y 2900/531; E05Y 2600/40; H01H 3/142
(Continued)

(56) References Cited

U.S. PATENT DOCUMENTS 5,327,680 A * 7/1994 Miller .................. E05F 15/42
200/61.43
5,384,982 A * 1/1995 Galperin .................. F16P 3/12
200/61.43
(Continued)

FOREIGN PATENT DOCUMENTS

DE 3304400 A1 8/1984
DE 3418589 A1 11/1985
(Continued)

OTHER PUBLICATIONS

Search Report and Written Opinion for International Patent Application No. PCT/EP2017/056275; dated Jun. 6, 2017.

*Primary Examiner* — Chi Q Nguyen
(74) *Attorney, Agent, or Firm* — Barnes & Thornburg LLP

(57) ABSTRACT

An extrusion profile for a door of a vehicle is made of an elastomeric material having at least one continuous switching element for a detection device for detecting a compression of the extrusion profile and/or is made of a continuous cut protection device, wherein the switching element and/or the cut protection device is/are integrated into the extrusion profile and can be cut to length with the extrusion profile.

22 Claims, 6 Drawing Sheets

(51) Int. Cl.
*E05F 15/46* (2015.01)
*E05F 15/42* (2015.01)
*E05F 15/44* (2015.01)
*B60J 10/86* (2016.01)

(52) U.S. Cl.
CPC ......... *E05F 15/46* (2015.01); *E05Y 2900/531* (2013.01)

(58) Field of Classification Search
USPC ........ 49/26, 27, 28; 200/61.43, 61.81, 61.82
See application file for complete search history.

(56) References Cited

U.S. PATENT DOCUMENTS

| | | | | |
|---|---|---|---|---|
| 5,847,289 | A | 12/1998 | Lehnen | |
| 6,740,826 | B1* | 5/2004 | Friedrich | H01H 3/142 200/61.43 |
| 6,955,079 | B2* | 10/2005 | Ishihara | E05F 15/44 318/445 |
| 7,616,895 | B2* | 11/2009 | Leeser | F16P 3/144 250/221 |
| 8,061,084 | B2* | 11/2011 | Katzensteiner | B60J 10/40 49/483.1 |
| 8,112,940 | B2* | 2/2012 | Mayer | E06B 7/2309 160/199 |
| 8,752,332 | B2* | 6/2014 | Thiele | B60J 5/06 49/27 |
| 8,854,061 | B2* | 10/2014 | Suhara | E05F 15/46 200/61.43 |
| 10,246,927 | B2* | 4/2019 | Castello | E05F 15/42 |
| 2012/0081130 | A1* | 4/2012 | Provenzano | E05F 15/44 324/649 |
| 2012/0267914 | A1* | 10/2012 | Thiele | E05F 15/44 296/146.9 |
| 2015/0042361 | A1* | 2/2015 | Matsuda | B60J 10/273 324/661 |

FOREIGN PATENT DOCUMENTS

| | | |
|---|---|---|
| DE | 4427537 A1 | 2/1996 |
| DE | 19720713 C1 | 5/1998 |
| DE | 29921958 U1 | 4/2001 |
| DE | 102012101543 A1 | 9/2012 |
| EP | 1447512 A2 | 8/2004 |
| WO | 0057013 A1 | 9/2000 |

* cited by examiner

EXTRUSION PROFILE AND METHOD FOR PRODUCING THE SAME, AND DOOR FOR A VEHICLE

PRIORITY AND CROSS REFERENCE

This patent application is a U.S. National Phase of International Patent Application No. PCT/EP2017/056275, filed Mar. 16, 2017, which claims priority to German Patent Application No. 10 2016 105 164.0 filed Mar. 21, 2016, the disclosure of which being incorporated herein by reference in their entireties.

FIELD

Disclosed embodiments proceed from a device and from a method according to the generic type of an extruded profile for a door for a vehicle.

BACKGROUND

A trap protection installation in order to avoid injuries, for example when fingers are jammed in the door gap, can be disposed on a door gap of a vehicle.

SUMMARY

Against this background, by way of the approach proposed here, an extruded profile from an elastomeric material and a method for producing an extruded profile, as well as a door for a vehicle, are proposed.

BRIEF DESCRIPTION OF THE FIGURES

Exemplary embodiments of the approach proposed here are illustrated in the drawings and explained in more detail in the description hereunder. In the drawings.

DETAILED DESCRIPTION

Figure 1:
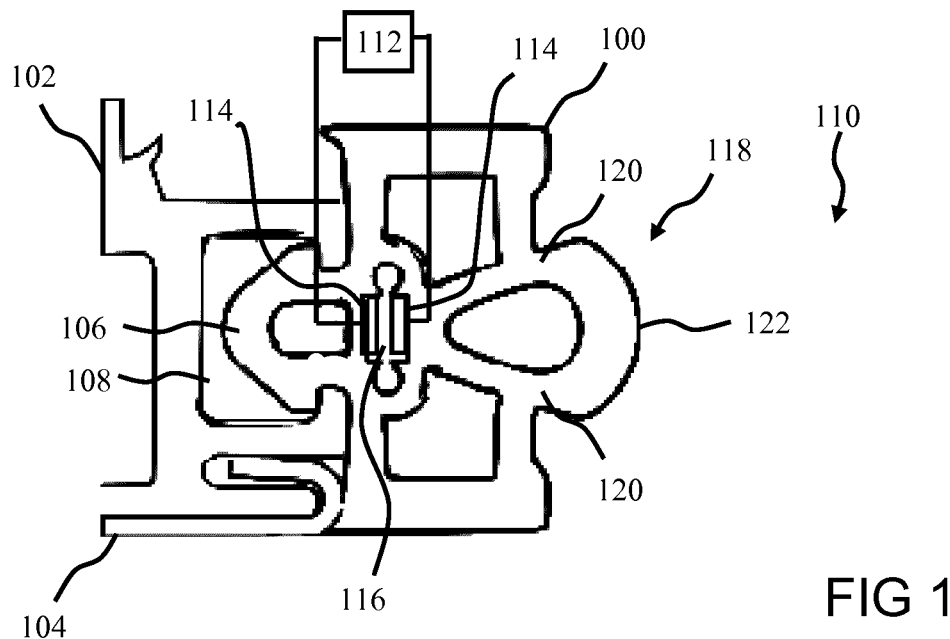
FIG. 1 shows a sectional illustration through an assembled extruded profile according to one exemplary embodiment.

Jamming in the door gap can be identified by an detection installation which is integrated in a trap protection installation. At least parts of the detection installation can be integrated directly in a rubber door seal of the trap protection installation. On account thereof, the rubber door seal and the integrated parts can conjointly be trimmed to length.

An integral construction mode which enables a reduction in components results on account thereof, since a plurality of functions such as the jamming protection, the jamming detection, and the "jamming trauma" are merged into one component. A simple functional principle results on account of an encapsulated maintenance-free system which is immune to external influences. An evaluation is possible by way of existing door control systems. A functional failure can be detected, and an enhanced security in terms of vandalism results in specific variants of embodiments.

An extruded profile for a door for a vehicle is proposed, wherein the extruded profile is made from an elastomeric material having at least one continuous switch element for a detection installation for detecting a compression of the extruded profile, and/or one continuous cutting-protection installation, wherein the switch element and/or the cutting-protection installation are/is integrated in the extruded profile and are/is capable of being trimmed to length conjointly with the extruded profile.

A vehicle can be understood to be, for example, a vehicle for conveying passengers. This herein can be a rail vehicle or a road vehicle. Moreover, the extruded profile can also be used in other fields of application in which identifying a jamming action or a deformation, for example in a closing procedure, is of interest. An extruded profile can theoretically be understood to be a strand to be produced of infinite length, having a consistent cross-sectional area. An elastomeric material can have elastic material properties. The elastomeric material can be, for example, rubber or a suitable plastics material. A switch element, while using a counterpart which can also be a switch element of the same type, can be configured for depicting a compression of the extruded profile in the signal. The switch element, like the extruded profile, can theoretically be embodied so as to be endless. A detection installation can have electrical components for operating the switch element. A cutting-protection installation can be referred to as an anti-vandalism protection installation. The protection installation can be disposed so as to be adjacent to the at least one switch element. The cutting-protection installation can be capable of being trimmed to length conjointly with the extruded profile. The cutting-protection installation can be shaped so as to be immune to cuts. The extruded profile can have an enhanced anti-vandalism security on account of the cutting-protection installation.

The switch element can be an optical reflector element that is aligned in a direction of main extent of the extruded profile. A reflector element can be a reflecting tubular cavity. A surface of the cavity can be smooth and/or specular. On account thereof, the reflector element can also be applied to curved profiles. A reflector can be produced, for example, by extrusion by way of a property of the material per se. The reflector can likewise be subsequently evaporatively deposited. The reflector element can be coupled to a transmitter and to a receiver. Damping of the reflector element, or a loss of a radiation that is directed through the reflector element, respectively, is increased by a compression of the reflector element that is caused by a compression of the extruded profile, and a corresponding variation at the receiver can be detected and evaluated.

The switch element can be a light conductor that is aligned in the direction of main extent. A light conductor, also referred to as fiber optics cable, reflects light by way of a total reflection on a boundary surface of the fiber optics cable. The light conductor, in a manner corresponding to that of the reflector element, can be supplemented with a transmitter and a receiver. The damping, or the loss, respectively, of a radiation that is directed through the reflector element is increased by a flexing action or a compression of the light conductor that can be caused by a compression of the extruded profile, and a corresponding variation at the receiver can be detected and evaluated.

The switch element can be incorporated into the extruded profile subsequently to extruding. The switch element can be evaporatively deposited, for example. On account of the subsequent integration of the switch element, materials which are not capable of extrusion can be used. Likewise, a first switch element can be extruded and a second switch element can be subsequently incorporated.

The switch element can be embedded in the elastomeric material. The switch element can be extruded. The at least one switch element can be extruded conjointly with the elastomeric material from a contoured nozzle. On account thereof, a reliable connection between the switch element and the elastomeric material can be achieved, and no separate production operation is required for combining the at least one switch element and the extruded profile.

The switch element can be a solenoid plunger for plunging into a coil installation. The solenoid plunger, when plunging into the coil installation, can be shaped so as to influence a magnetic field of the coil installation. A respective plunging movement can be caused by a compression of the extruded profile. The solenoid plunger can be made from a soft magnetic material. The solenoid plunger can be electrically conducting, for example. The switch element changes the magnetic resistance of the magnetic circuit. The switch element can be mounted so as to be movable transversely to a coil plane of the coil installation. According to one embodiment, the coil installation can be integrated in the extruded profile. For example, part-coilings of the coil installation can be integrated in the elastomeric material and be trimmed to length conjointly with the extruded profile. The part-coilings can subsequently be interconnected in an electrically conducting manner at the cutting edges of the extruded profile, so as to configure an electric coil. The coil can also be attached after the extrusion process.

The detection installation can have two switch elements in the form of two electric conductors which are aligned in a direction of main extent of the extruded profile. The conductors can be mutually spaced apart by a compressible intermediate space. An intermediate space can be referred to as a gap. The conductors can have physical contact faces by way of which a current flow between the conductors can be established in the event of a compression of the intermediate space. The compression can be readily detected on account of the electrical contact between two conductors. According to different exemplary embodiments, a respective electric conductor can be shaped from metal and/or from an electrically conductive elastomeric material, for example. An electrically conductive elastomeric material can be an elastomeric material in which electrically conductive particles are dispersed, for example. A metallic conductor can also be embedded in an electrically conducting elastomer.

The cutting-protection installation can have a cutting-protection element which is aligned so as to be parallel with the switch element and is embedded in the elastomeric material. The cutting-protection element can be metallic, for example be a metal strip or metal net. The cutting-protection element can likewise be from a fiber-reinforced plastics material such as, for example GRP or CRP. The cutting-protection element can also be a textile cutting-protection element. The cutting-protection element can be aligned such that the basic function of the jamming protection, or of the jamming detection of the switch element, respectively, continues to be provided. The cutting-protection element can be extruded. The cutting-protection element in relation to an assumed cutting direction can be disposed ahead of the switch element in order for the switch element to be protected.

The switch element can be part of the cutting-protection installation. The switch element can be shaped so as to be immune to damage on account of cuts. The switch element can thus have a double function.

The switch element can be disposed in a fastening region of the extruded profile. The fastening region can be provided in order for the extruded profile to be fastened to a door leaf, for example. To this end, the fastening region can be fitted into a receptacle installation, for example a receptacle contour of the door leaf. In the event of a suitable shaping of the receptacle installation, the fastening region in the assembled state can be disposed so as to be protected against cuts. The switch element is very well protected against vandalism on account of the position of the at least one switch element in the fastening region.

The extruded profile can have a transmission installation. The transmission installation can be disposed between a physical contact face of the extruded profile and the switch element. The transmission installation can be configured for transmitting a deformation of the physical contact face to the switch element. A physical contact face can be understood to be an external face of the extruded profile which is deformed in the case of a jamming procedure. The transmission installation enables a precise detection of the deformation, even when the at least one switch element is disposed on a side of the extruded profile that is remote from the physical contact face.

Such a transmission installation can have a mechanical structure which in a transmission direction from the physical contact face to the at least one switch element has a predefined rigidity. The rigidity herein characterizes to what degree the switch element is deformed in the event of pressure acting on the physical contact face. For example, a gearing ratio between a deflection of a portion of the physical contact face that is caused by a deformation and the deflection of a portion of the switch element that lies so as to be level in height with the portion of the physical contact face can be defined by the transmission installation. The mechanical structure can also be shaped such that damage to the switch element is prevented in the event of a severe deformation of the extruded profile, for example.

A door for a vehicle comprises a door leaf and an extruded profile mentioned that is disposed on an edge of the door leaf. In this way, the extruded profile can be advantageously used in conjunction with the door. Alternatively or additionally to a disposal of the extruded profile, the extruded profile can also be disposed on a door frame, for example. The extruded profile can be considered to be a component part of the door.

Furthermore, a method for producing an extruded profile mentioned is proposed, wherein the method comprises the following steps:

extruding the elastomeric material to the extruded profile; and integrating the switch element and/or the protection element into the extruded profile.

The operations of extruding and integrating can be carried out simultaneously. At least one switch element and/or the cutting-protection installation can be extruded simultaneously with the elastomeric material. The extruded profile can be produced in a simple and rapid manner on account of simultaneous extruding and integrating. Both the switch element and the cutting-protection installation can also be integrated.

The switch element and/or a further switch element can be evaporatively deposited on the elastomeric material. A minor layer thickness can be achieved by evaporative depositing.

The method can comprise an operation of trimming the extruded profile to a desired length. The at least one switch element and/or the cutting-protection installation herein can be trimmed to length simultaneously and conjointly with the extruded profile in one operative operation. Trimming to length can be performed, for example, shortly after an extrusion nozzle.

In the description hereunder of exemplary embodiments, identical or similar reference signs are used for elements of similar function illustrated in the various figures, wherein a repeated description of the elements is dispensed with.

FIG. 1 shows a sectional illustration through an assembled extruded profile 100 according to one exemplary embodiment. The extruded profile 100 is deformable and is composed of a permanently elastic elastomeric material. The extruded profile 100 is connected to an assembly profile 102 of a door 104 of a vehicle. The assembly profile 102 can be referred to as a TFL profile. The vehicle is a rail vehicle, for example, and the door 104 is a sliding door of the rail vehicle. An arrow-shaped assembly region 106 of the extruded profile 100 is latch-fitted in a T-groove 108 of the assembly profile 102.

The extruded profile 100 can be referred to as a trap protection profile 100 for a door gap 110 of the door 104. According to one exemplary embodiment, the vehicle has a detection installation 112, or detection unit 112, respectively, for detecting an item jammed in the door gap 110. To this end, two switch elements 114 continuing in the extrusion direction are embedded in the extruded profile 100 according to this exemplary embodiment, the switch elements 114 being connected in a signal-transmission-capable manner to the detection installation 112 by interfaces. The switch elements 114 are mutually spaced apart by an intermediate space 116, or a gap 116, respectively, that is aligned transversely to a detection direction. The detection installation 112 according to one exemplary embodiment is configured for detecting when the two switch elements 114 approach or physically contact one another. For example, the detection installation 112 can be configured for detecting such an approach or physical contact, which can result from a deformation of the extruded profile 100 in the event of a jamming procedure, by way of measurement of current, a capacitive or an inductive measurement.

According to one exemplary embodiment, the deformation that in a jamming procedure acts on the external side of the extruded profile 100 is transmitted by a transmission installation 118 of the extruded profile 100 to one of the switch elements 114. The transmission installation 118 to this end has a suitable mechanical structure, here for example two ribs 120 which are disposed in a V-shaped manner and which connect a physical contact face 122 of the extruded profile 100 that projects in an arcuate manner to the elastomeric material in the region of the switch element 114. The profile 100 here is designed in such a manner that the path, or the deformation, respectively, of the rubber at the physical contact face 122 that shapes a front edge of the extruded profile 100 is transmitted by way of a suitable gearing ratio such that the sensitivity of the at least one switch element 114 can thus be set or controlled, respectively.

The switch elements 114 have an electrically conducting material, for example, such that an electrical contact can be established when there is physical contact with the switch elements. The detection installation 112 registers a resulting current flow and can provide a jamming signal, for example in order to stop a drive of the door 104.

In one exemplary embodiment, the switch elements 114 are strips from metal, in particular from stainless steel. The strips 114 are extruded conjointly with the elastomeric material. When extruded, the elastomeric material is fixedly connected to the metal. On account of the strips 114 from metal, the switch elements 114 can only be damaged with difficulty. On account thereof, the trap protection profile 100 is protected against vandalism, for example.

In other words, FIG. 1 by way of the example of the cross section of an extruded profile 100 having an integrated detection in the form of an integrated jamming protection or an integrated jamming detection in entry systems. As opposed to detection possibilities for a jamming protection to date in which the sensor assembly such as, for example a safety strip, is installed after the finger protection profile has been extruded, in the approach proposed here the switch elements 114 such as an electric switch or a fiber optics cable are already integrated directly in the profile 100, or conjointly extruded, respectively.

Figure 2:
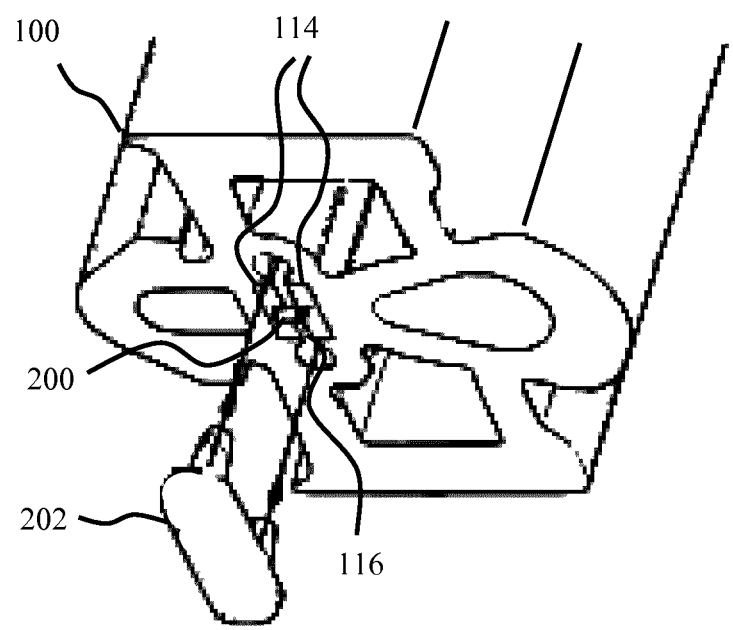
FIG. 2 shows a spatial illustration of an extruded profile according to one exemplary embodiment.

FIG. 2 shows a spatial illustration of an extruded profile 100 according to one exemplary embodiment. The extruded profile 100 corresponds substantially to the extruded profile in FIG. 1. A cutting face of the extruded profile 100 which is transverse to a direction of main extent of the extruded profile 100 is illustrated. The extruded profile 100 has been trimmed to length from a continuous strand at the cutting face. In the trimming to length, the switch elements 114 that were integrated into the extruded profile 100 prior to the trimming to length have also been severed. The cutting face of the elastomeric material is thus also a cutting face of the switch elements 114.

The switch elements 114 here are electrically conducting. A terminating resistor 200 which electrically interconnects the switch elements 114 is additionally illustrated here. A defined closed-circuit current can flow through the switch elements 114 by way of the terminating resistor 200. In the absence of a closed-circuit current the current circuit is interrupted, which indicates a defect such as a line breakage or damage to at least one of the switch elements. In this way, a line breakage in the case of the integrated electrical safety strip 114 can be identified with the aid of the closed-current principle. For this reason, the terminating resistor 200 embodied in a suitable size is attached according to one exemplary embodiment.

An end cap 202 which is shaped so as to close the intermediate space 116 between the switch elements 114 at the interface is furthermore illustrated. The end cap 202 has two chamfered pins which are plugged into cylindrical ducts that are configured in the extruded profile 100 on both sides of the intermediate space 116. The end cap 202 can also be adhesively bonded or welded to the elastomeric material.

After the extrusion, the endless material being created can be cut off in the desired length, if required, and the electrical or optical, respectively, connectors are attached. Here, the terminating resistor 200 for monitoring functions is attached, for example. In a further operation the extruded profile 100, also referred to as a system, can be encapsulated at one or both ends by the end cap 202, also referred to as a plug, so as to avoid the ingress of moisture. The encapsulation according to one exemplary embodiment is performed in that the end cap 202 is adhesively bonded or molded thereto.

The switch elements 114 in the form of electrically conducting strips that are conjointly extruded according to one exemplary embodiment are composed of electrically conducting materials. For example, the switch elements 114 can be from metal, wherein stainless steel is advantageous in terms of the long-term durability. The switch elements 114 can likewise be from an elastomer. The elastomer can be extruded in combination with metal wires.

A switch element 114 in the form of a fiber optic cable can be conjointly extruded in place of the electrically conducting strips, and additionally or alternatively a switch element 114 in the form of a reflector 114, a safety strip, or of a switch strip can be conjointly extruded.

In one exemplary embodiment the switch elements 114 are optical switch elements 114. One of the switch elements 114 herein has a light conductor, and the other switch element 114 has a reflector. The light conductor is extruded conjointly with the elastomeric material. The reflector is evaporatively deposited after extruding.

Various possibilities are available in order for the vandalism protection of the sensor system that is based on the at least one switch element 114 to be enhanced. For example, as is described hereunder by means of FIG. 3, a metal strip or similar, or as is described hereunder by means of FIG. 4, a sufficiently thick metallic wire can be conjointly extruded in the case of elastomeric strips. In the case of elastomeric strips, the protection can be enhanced by an additional insert as in FIG. 3. Likewise, the detection unit 114 can be displaced into the door leaf profile as in FIG. 5.

Figure 3:
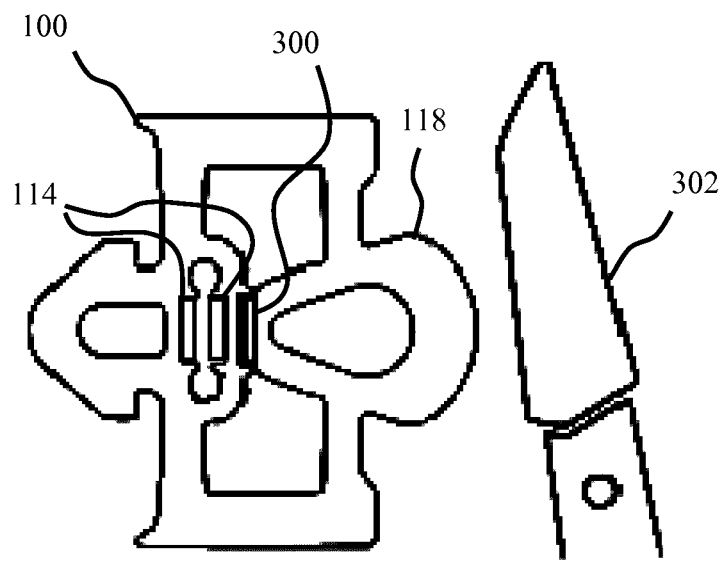
FIG. 3 shows a sectional illustration through an extruded profile having a cutting-protection installation according to one exemplary embodiment.

FIG. 3 shows a sectional illustration through an extruded profile 100 having a cutting-protection installation 300 according to one exemplary embodiment. The extruded profile 100 corresponds substantially to the extruded profiles in FIGS. 1 and 2. In addition, an additional metallic or similar insert as a cutting-protection installation 300 is integrated in the elastomeric material between the transmission installation 118 and the region of the switch elements 114. The cutting-protection installation 300 in the form of a metal strip has been extruded conjointly with the elastomeric material to the endless extruded profile 100.

The extruded profile 100 illustrated here has an enhanced vandalism protection. For example, the switch elements 114 which here are embodied as safety strips are protected by the cutting-protection installation 300 when a blade 302 cuts through the finger protection rubber of the extruded profile 100. On account thereof, the function of detecting a jamming continues to be provided even in the event of profound damage to the extruded profile 100.

Figure 4:
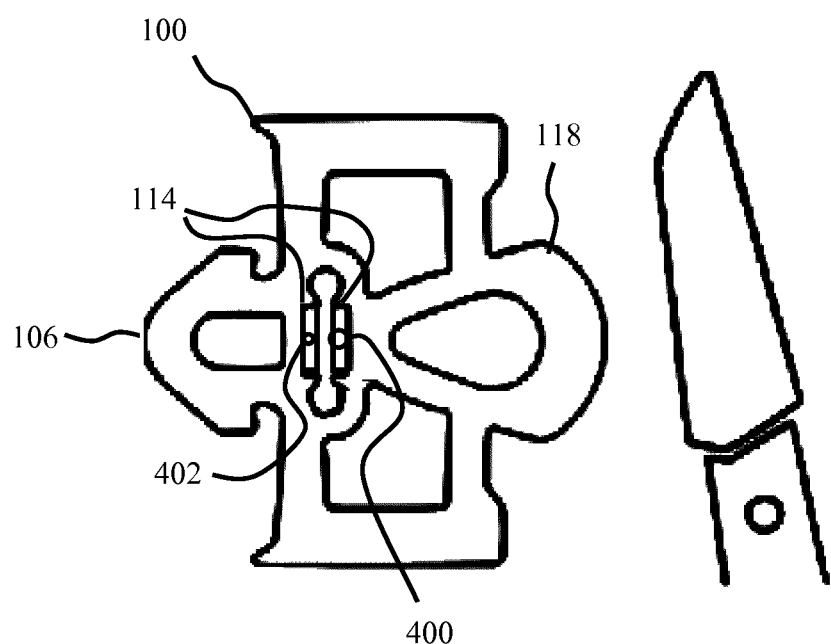
FIG. 4 shows a sectional illustration through a reinforced extruded profile according to one exemplary embodiment.

FIG. 4 shows a sectional illustration through a reinforced extruded profile 100 according to one exemplary embodiment. The extruded profile 100 corresponds substantially to the extruded profiles in FIGS. 1 and 2. The switch elements 114 here are extruded from an electrically conducting elastomeric material. Reinforcing and electrically conducting metal wires 400, 402 are additionally integrated in the switch elements 114 here. The metal wires 400, 402 are of dissimilar thicknesses. The metal wire 400 which is disposed in the switch element 114 that faces the transmission installation 118 is thicker than the metal wire 402 that faces the fastening region 106.

Figure 5:
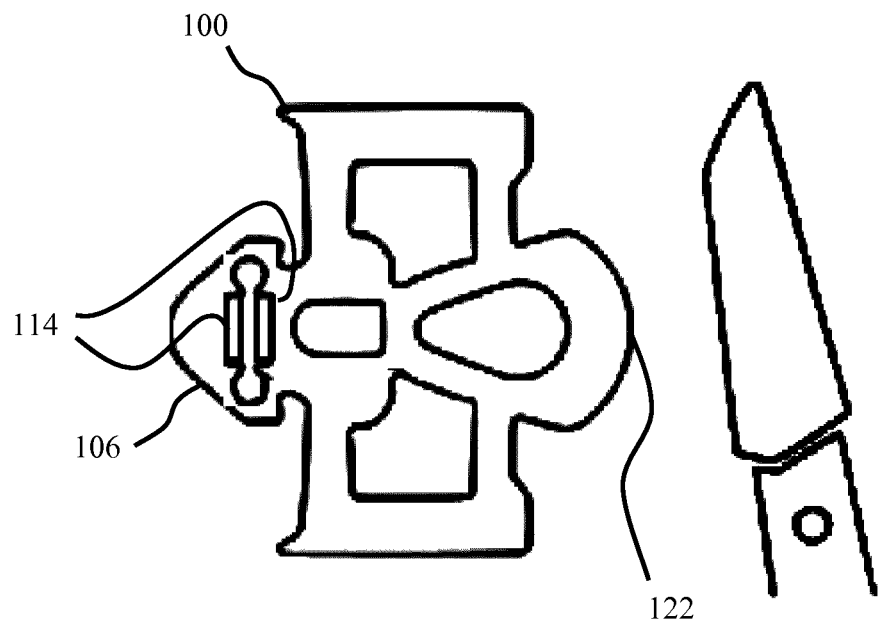
FIG. 5 shows a sectional illustration through an extruded profile having protected switch elements according to one exemplary embodiment.

FIG. 5 shows a sectional illustration through an extruded profile 100 with protected switch elements 114 according to one exemplary embodiment. An external contour of the extruded profile 100 corresponds substantially to one of the extruded profiles illustrated in FIGS. 1 to 4. As opposed thereto, the switch elements 114 here are disposed in the interior of the fastening region 106 and thus in a secure region. The fastening region 106 as shown in FIG. 1 in the installed state is disposed in a T-groove and is thus enclosed by metal on three sides. The assembly profile is cut-resistant. The extruded profile 100 illustrated here is therefore very well protected against vandalism or cuts, respectively.

The fastening region 106 according to this exemplary embodiment is an appendage of the extruded profile 100 that projects from a side of the extruded profile 100 that is opposite the physical contact face 122. The fastening region 106 has two mutually opposite latching hooks which enable the extruded profile 100 to fixedly jam in the assembly profile.

Figure 6:
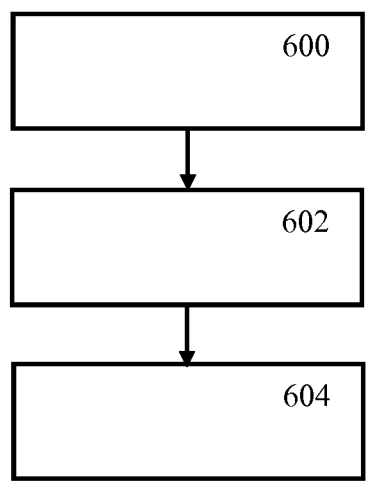
FIG. 6 shows a flow diagram of a method for producing an extruded profile according to one exemplary embodiment.

FIG. 6 shows a flow diagram of a method for producing an extruded profile according to one exemplary embodiment. An extruded profile as is illustrated in FIGS. 1 to 5 can be produced by the method. The method comprises an operation 600 of extruding, and an operation 602 of integrating. In operation 600 of extruding, an elastomeric material is extruded by a nozzle of an extruder to the extruded profile. In operation 602 of integrating, at least one switch element is integrated into the extruded profile.

In one exemplary embodiment, the switch element is embedded in the elastomeric material during extruding 600. To this end, the switch element as an endless material or as off-the-roll material exits the nozzle of the extruder conjointly with the elastomeric material.

Alternatively, an electric conductor or a reflector can also be applied in a further production process operation. The conductor or reflector can be evaporatively deposited, for example.

In one exemplary embodiment, the extruded endless material, after the operation 600 of extruding and the operation 602 of integrating, in an operation 604 of trimming to length is trimmed to pieces having a desired length. The elastomeric material and the at least one switch element herein are severed at a cutting face by a trimming installation.

Figure 7:
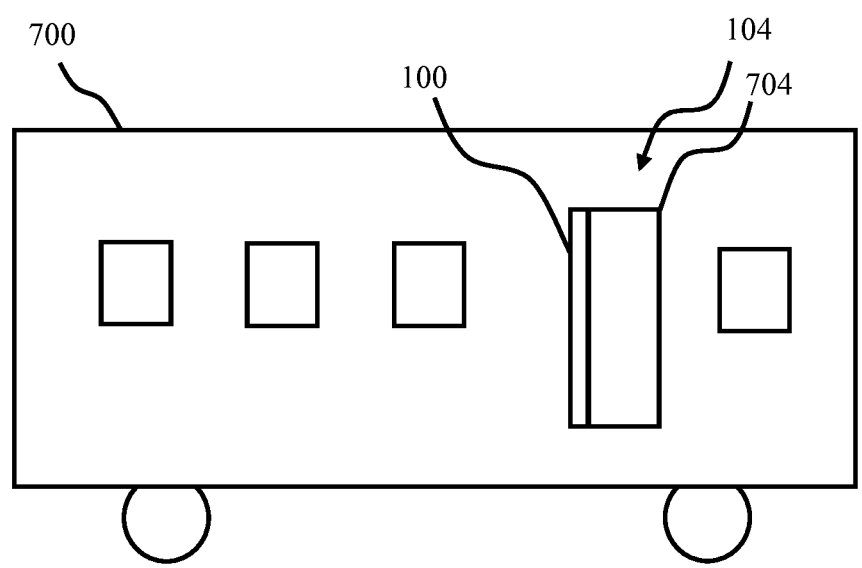
FIG. 7 shows a schematic illustration of a vehicle having an extruded profile according to one exemplary embodiment.

FIG. 7 shows a schematic illustration of a vehicle 700, here a rail vehicle for example, according to one exemplary embodiment. The vehicle 700 has a door 104, the door leaf 704 of the latter along an edge being provided with a jamming protection in the form of a door rubber which is embodied as an extruded profile 100 as is described by means of the preceding figures.

Figure 8:
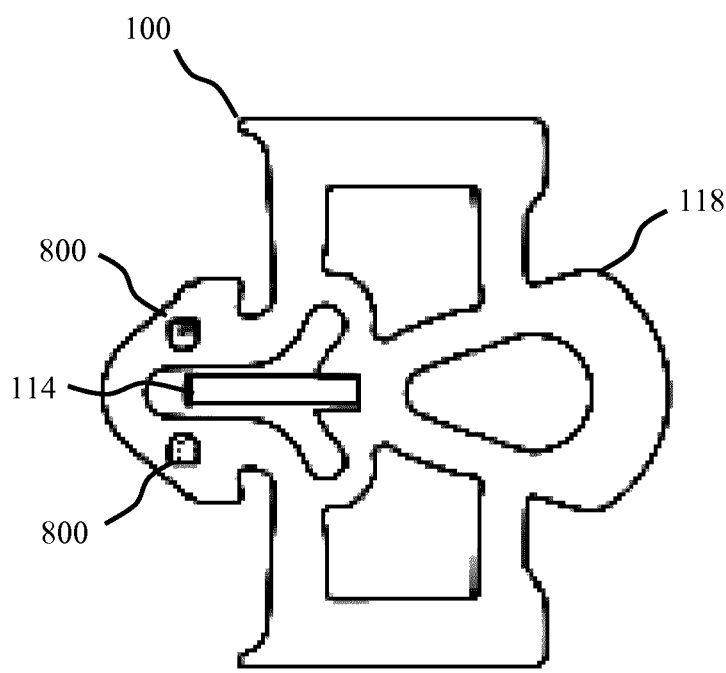
FIG. 8 shows a sectional illustration through an extruded profile having a switch element configured as a solenoid plunger according to one exemplary embodiment.

FIG. 8 shows a sectional illustration through an extruded profile 100 having a switch element 114 that is configured as a solenoid plunger, according to one exemplary embodiment. An external contour of the extruded profile 100 corresponds substantially to one of the extruded profiles illustrated in FIGS. 1 to 5. As opposed thereto, an electric coil 800 is integrated in the elastomeric material in the fastening region 106. The solenoid plunger 114 as a strip is conjointly extruded with the elastomeric material. The solenoid plunger 114 is coupled to the transmission installation 118 and is aligned substantially in a movement direction that is expected in the event of a compression of the extruded profile 100. The solenoid plunger 114 protrudes into a cavity of the extruded profile 100. The solenoid plunger 114 within the cavity is movable in the movement direction.

The coil 800 is assembled from two conjointly extruded part-coilings. The part-coilings are disposed on both sides of the solenoid plunger 114 and have been trimmed to length conjointly with the elastomeric material and the solenoid plunger 114. The part-coilings have been electrically interconnected at the interfaces in order for the coil 800 to be configured. A coil plane of the coil 800 is aligned so as to be transverse, or perpendicular, respectively, to the movement direction of the solenoid plunger 114.

When the solenoid plunger 114 is moved relative to the coil 800, or plunges into the latter, respectively, an inductivity of the coil 800 is varied. The inductivity is detected. The variation of the inductivity signals a deformation of the extruded profile 100.

In one exemplary embodiment (not illustrated) the coil 800 is not disposed in the extruded profile 100 but in the assembly profile of the door. On account thereof, an electrical connection between the extruded profile 100 and the detection installation can be dispensed with.

In other words, FIG. 8 shows an extruded profile 100 for an inductive detection. In the event of jamming, the metal strip 114 which is conjointly extruded with the extruded profile 100, embodied here as a finger protection profile, plunges into the coil 800. The variation of the magnetic field created on account thereof is evaluated by a suitable installation, on account of which jamming can be detected.

The coil 800 can also be attached after the extruded profile 100 has been cut off. It is not necessary for the coil 800 to be wound on the finger protection profile 100, but the coil 800 can also be attached to the door leaf profile.

Figure 9:
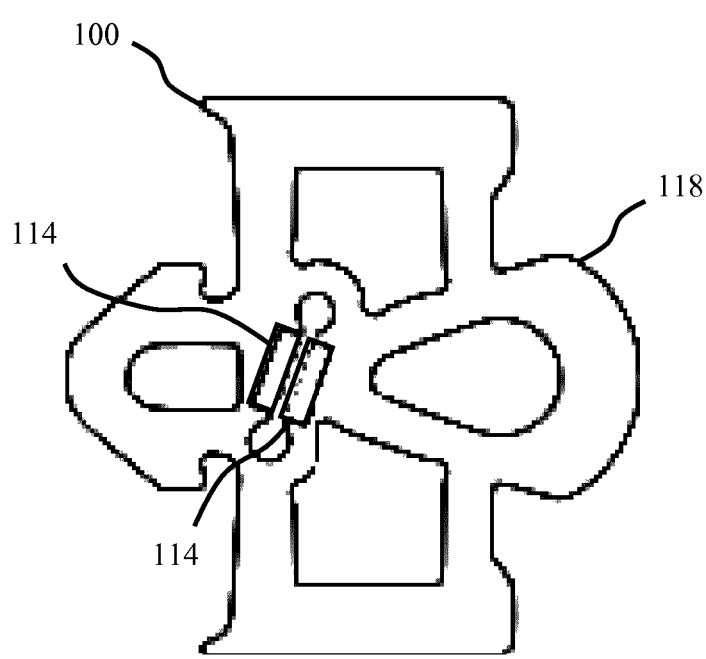
FIG. 9 shows a sectional illustration through an extruded profile having obliquely disposed switch elements according to one exemplary embodiment.

FIG. 9 shows a sectional illustration through an extruded profile 100 having obliquely disposed switch elements 114 according to one exemplary embodiment. The extruded profile 100 corresponds substantially to the extruded profile illustrated in FIG. 1. As opposed thereto, the two switch elements 114 here are disposed at an angle to the expected movement direction of the transmission installation 118 in the event of a compression of the extruded profile 100. The arrangement of the switch element 114 herein is arbitrary.

Figure 10:
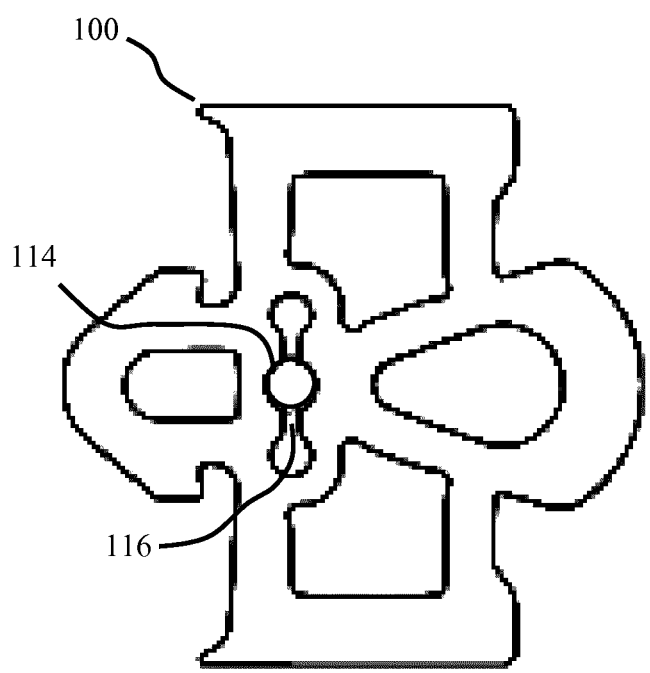
FIG. 10 shows a sectional illustration through an extruded profile having a light conductor as the switch element according to one exemplary embodiment.

FIG. 10 shows a sectional illustration through an extruded profile 100 having a light conductor 114 as the switch element according to one exemplary embodiment. The light conductor 114 is extruded conjointly with the elastomeric material. The light conductor 114 is disposed in the gap 116 and connected to both sides of the gap 116. A light source (not illustrated here) is disposed on a first end of the light conductor 114. A light sensor (not illustrated here) is disposed on a second end of the light conductor 114 that lies opposite the first end.

In one exemplary embodiment, the light source and the light sensor are disposed on the same end of the light conductor 114. A reflector is disposed on the second end herein.

The light source is configured for coupling light into the light conductor 114. The light is totally reflected on a boundary surface of the light conductor 114 and directed to the light sensor. The light sensor depicts an incoming light intensity in an electrical signal for the detection installation. When the extruded profile 100 is deformed, the light conductor 114 is likewise deformed. On account of the deformation, the light is reflected to a lesser degree on the boundary surface. The light intensity arriving at the light sensor is reduced. The variation of the light intensity is depicted in the signal.

Figure 11:
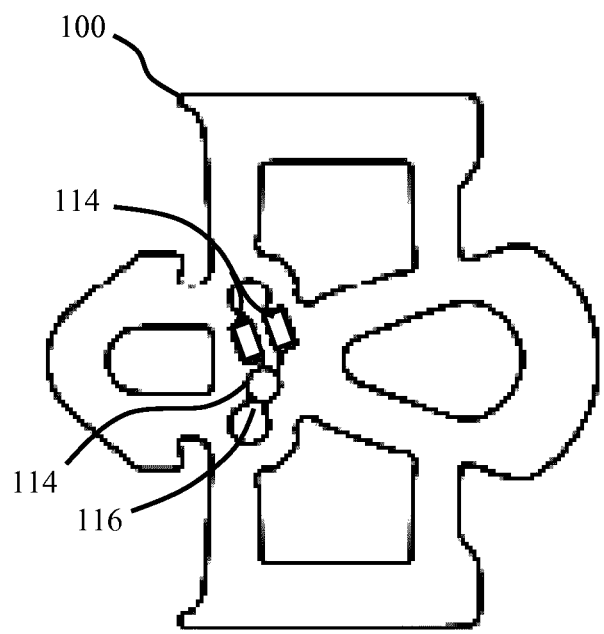
FIG. 11 shows a sectional illustration through an extruded profile having different switch elements according to one exemplary embodiment.

FIG. 11 shows a sectional illustration through an extruded profile 100 having different switch elements 114 according to one exemplary embodiment. An external contour of the extruded profile 100 corresponds substantially to one of the extruded profiles illustrated in the preceding figures. The extruded profile 100 additionally has switch elements 114 having dissimilar sensor principles. Two electrically conducting physical contact faces 114 that are spaced apart from one another by the intermediate space 116, as shown in FIGS. 1 to 5, here are disposed beside a light conductor 114 that bridges the intermediate space 116, the light conductor 114 being as described by means of FIG. 10. This combination of two dissimilar sensor principles has been chosen in a merely exemplary manner. For example, switch elements 114 having other sensor principles, or else switch elements 114 having identical sensor principles, can also be combined in one extruded profile 100.

LIST OF REFERENCE SIGNS

100 Extruded profile
102 Assembly profile
104 Door
106 Assembly region
108 T-groove
110 Door gap
112 Detection installation
114 Switch elements
116 Intermediate space
118 Transmission installation
120 Ribs
122 Physical contact face
200 Terminating resistor
202 End cap
300 Cutting-protection installation
302 Blade
400 Thick metal wire
402 Thin metal wire
600 Operation of extruding
602 Operation of integrating
604 Operation of trimming to length
700 Vehicle
704 Door leaf
800 Coil

The invention claimed is:

1. An extruded profile for a door for a vehicle, wherein the extruded profile comprises:
    an elastomeric material having at least one continuous switch element for a detection installation for detecting a compression of the extruded profile, and
    one continuous cutting-protection installation,
    wherein the at least one switch element and/or the cutting-protection installation are/is integrated in the extruded profile and are trimmable to length conjointly with the extruded profile, wherein the cutting-protection installation has a cutting-protection element which is aligned in parallel with and upstream of the at least one switch element along an axial direction to protect the at least one switch element and is embedded in the elastomeric material.

2. The extruded profile of claim 1, wherein the switch element is an optical reflector element that is aligned in a direction of main extent of the extruded profile, or a light conductor that is aligned in the direction of main extent.

3. The extruded profile of claim 2, wherein the optical reflector element is incorporated into the extruded profile subsequent the extrusion of the extruded profile.

4. The extruded profile of claim 1, wherein the at least one switch element and the cutting-protection installation are embedded in the elastomeric material and are extruded.

5. The extruded profile of claim 1, wherein the at least one switch element is a solenoid plunger for plunging into a coil installation, wherein the solenoid plunger, when plunging into the coil installation is configured for influencing a magnetic field of the coil installation.

6. The extruded profile of claim 1, having two switch elements that form of two electric conductors which are aligned in a direction of main extent of the extruded profile and which are mutually spaced apart by a compressible intermediate space.

7. The extruded profile of claim 1, wherein the at least one switch element is part of the cutting-protection installation.

8. The extruded profile of claim 1, wherein the at least one switch element is disposed in a fastening region of the extruded profile.

9. The extruded profile of claim 1, further comprising a transmission installation which is disposed between a physical contact face of the extruded profile and the at least one switch element, and is configured for transmitting a deformation of the physical contact face to the at least one switch element.

10. A door for a vehicle, wherein the door comprises:
a door leaf; and
an extruded profile disposed on an edge of the door leaf, wherein the extruded profile includes an elastomeric material having at least one continuous switch element for a detection installation for detecting a compression of the extruded profile, and one continuous cutting-protection installation, and
wherein the at least one switch element and/or the cutting-protection installation are/is integrated in the extruded profile and are trimmable to length conjointly with the extruded profile, wherein the cutting-protection installation has a cutting-protection element which is aligned in parallel with and upstream of the at least one switch element along an axial direction to protect the at least one switch element and is embedded in the elastomeric material.

11. A method for producing an extruded profile extruded profile that includes an elastomeric material having at least one continuous switch element for a detection installation for detecting a compression of the extruded profile, and one continuous cutting-protection installation, wherein the at least one switch element and the cutting-protection installation are/is integrated in the extruded profile and are/is trimmable to length conjointly with the extruded profile:
extruding the elastomeric material to the extruded profile; and
integrating the at least one switch element and/or the cutting-protection installation into the extruded profile, wherein the cutting-protection installation has a cutting-protection element which is aligned in parallel with and upstream of the at least one switch element along an axial direction to protect the at least one switch element and is embedded in the elastomeric material.

12. The method of claim 11, wherein the operations of extruding and of integrating are carried out simultaneously, wherein the at least one switch element and the cutting-protection installation are extruded conjointly with the elastomeric material.

13. The method of claim 11, wherein in the integrating of the at least one switch element or a further switch element, and the switch element are evaporatively deposited on the elastomeric material.

14. The method of claim 11, further comprising trimming the extruded profile to a desired length, wherein the at least one switch element and the cutting-protection installation are trimmed to length conjointly with the extruded profile.

15. The method of claim 11, wherein the switch element is an optical reflector element that is aligned in a direction of main extent of the extruded profile, or a light conductor that is aligned in the direction of main extent.

16. The method of claim 15, wherein the optical reflector element is incorporated into the extruded profile subsequent to the extrusion of the extruded profile.

17. The method of claim 11, wherein the at least one switch element and the cutting-protection installation are embedded in the elastomeric material and are extruded.

18. The method of claim 11, wherein the at least one switch element is a solenoid plunger for plunging into a coil installation, wherein the solenoid plunger, when plunging into the coil installation is configured for influencing a magnetic field of the coil installation.

19. The method of claim 11, having two switch elements that form of two electric conductors which are aligned in a direction of main extent of the extruded profile and which are mutually spaced apart by a compressible intermediate space.

20. The method of claim 11, wherein the at least one switch element is part of the cutting-protection installation.

21. The method of claim 11, wherein the at least one switch element is disposed in a fastening region of the extruded profile.

22. The method of claim 11, further comprising a transmission installation which is disposed between a physical contact face of the extruded profile and the at least one switch element, and is configured for transmitting a deformation of the physical contact face to the at least one switch element.

* * * * *